July 13, 1965  A. R. SORENSON ETAL  3,194,061
INSTRUMENT FOR MEASURING HARDNESS OF THE SURFACE
OF A RESILIENT ROLL
Filed July 20, 1961  2 Sheets-Sheet 1

INVENTORS
Alan R. Sorenson
BY Carl M. Westbrook
Carl B. Dahl
ATTORNEYS

July 13, 1965  A. R. SORENSON ETAL  3,194,061
INSTRUMENT FOR MEASURING HARDNESS OF THE SURFACE
OF A RESILIENT ROLL
Filed July 20, 1961  2 Sheets-Sheet 2
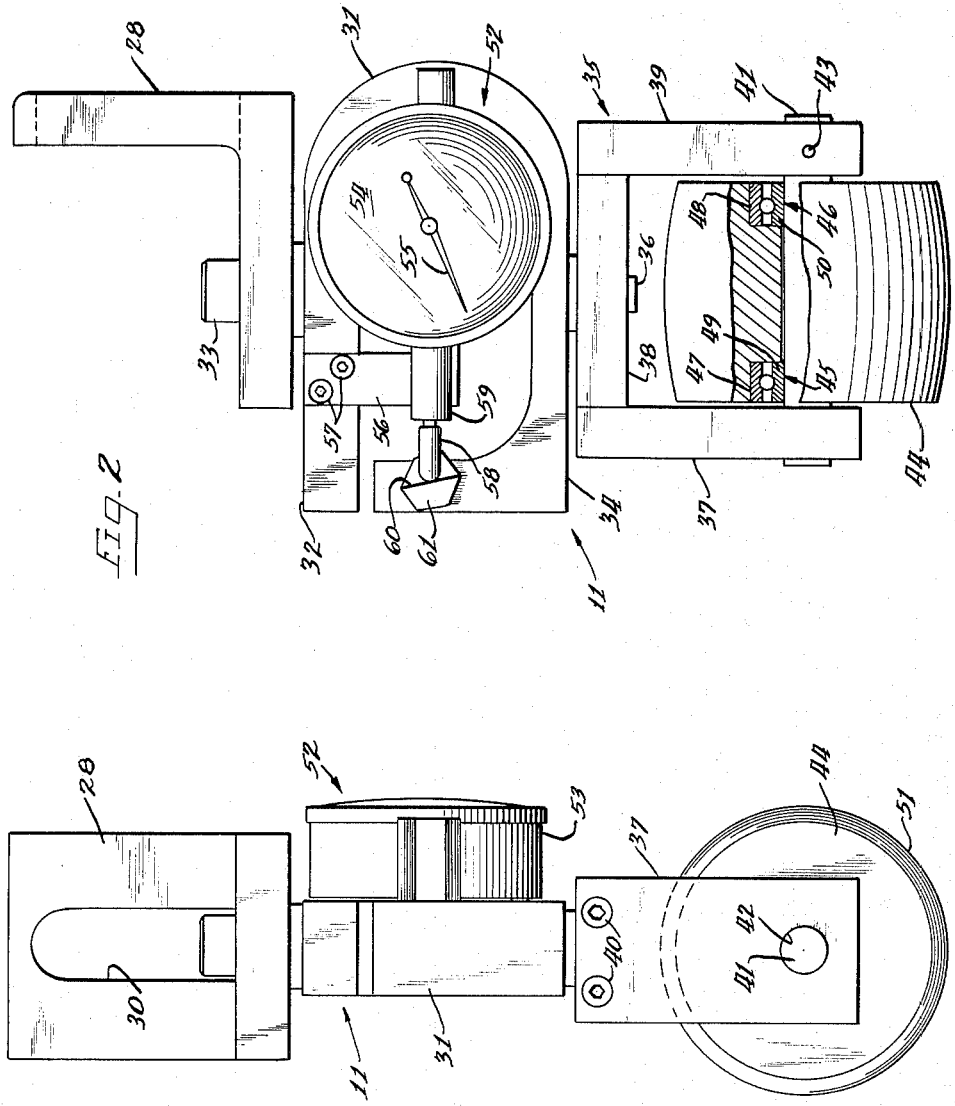
INVENTORS
Alan R. Sorenson
BY Carl M. Westbrook
Carl B. Dahl
ATTORNEYS

United States Patent Office 3,194,061
Patented July 13, 1965

3,194,061
INSTRUMENT FOR MEASURING HARDNESS OF THE SURFACE OF A RESILIENT ROLL
Alan R. Sorenson and Carl M. Westbrook, Beloit, Wis., and Carl B. Dahl, Rockton, Ill., assignors to Beloit Corporation, a corporation of Wisconsin
Filed July 20, 1961, Ser. No. 125,412
3 Claims. (Cl. 73—81)

This invention relates to measuring devices and, more particularly, to an apparatus for determining the existence and the extent or degree of hardness of subsurface hard spots or other defective portions of an otherwise resilient material.

Although the devices of this invention are especially adapated for locating subsurface hardspots in rubber covered press rolls for paper machines, and will be hereinafter specifically described in connection with such usage, it should be understood that the devices are capable of inspecting a resilient material on any type of member for hard spots, and that the invention is not limited to any particular use of the devices.

Press rolls of the type used on paper machines to press the paper web being produced are sometimes covered with a layer of a relatively resilient material such as rubber. It is important from the standpoint of producing a good quality product that the rubber layer on a press roll be as uniform as possible. However, this condition is not always easy to achieve and a defective portion of a layer is usually difficult to detect. It has been found that hard spots sometime develop beneath the surface of the rubber layer which, of course, are not apparent or there may be a gradual variation in the hardness. As previously stated, non-uniformities in the layer are undesirable because they are reflected in the condition of the product produced by the machine.

Accordingly, it is a general object of this invention to provide an improved apparatus for testing the resilient outer layer on a press roll for hard spots and other non-uniform portions.

It is another object of this invention to provide an apparatus for determining the hardness of a portion of the resilient outer layer of a press roll.

It is still another object of this invention to provide an apparatus for testing the resilient outer layer of a roll for a defective portion which is mounted adjacent to the roll to be tested in such a manner that its position can be varied and test the entire length and circumference of the roll.

These and other objects of the invention are attained by providing a test apparatus that includes means for mounting a wheel in firm contact with the rubber layer on the roll to be tested, means fastened to said wheel for indicating the extent or magnitude of the force exerted by the roll on the wheel as the press roll is rotated about its axis, and traversing means coupled to said wheel for varying the position of the test apparatus along the length of the roll.

By noting variations in the amount of the force exerted by the press roll on the wheel, the existence and position of subsurface hard spots can be pin-pointed and gradual variations in the hardness noted. Measurements of the magnitude of the hardness of a section can also be made by determining the area of contact between the wheel and the press roll and taking a reading of the force being exerted. The traversing means permits the entire length of the roll to be tested so that, as the roll is turned about its axis or the traversing means is operated, the entire surface area of the roll may be inspected.

This invention may be better understood and other objects, features and advantages more apparent from the following detailed description taken in conjunction with the accompanying figures of the drawings, wherein like reference numerals refer to like parts, in which:

FIGURE 2 is an elevational view of a portion of the apparatus with some parts broken away to show underlying parts;

FIGURE 3 is a side elevational view of the portion of the apparatus illustrated in FIGURE 2.

As shown on the drawings:

Figure 1:
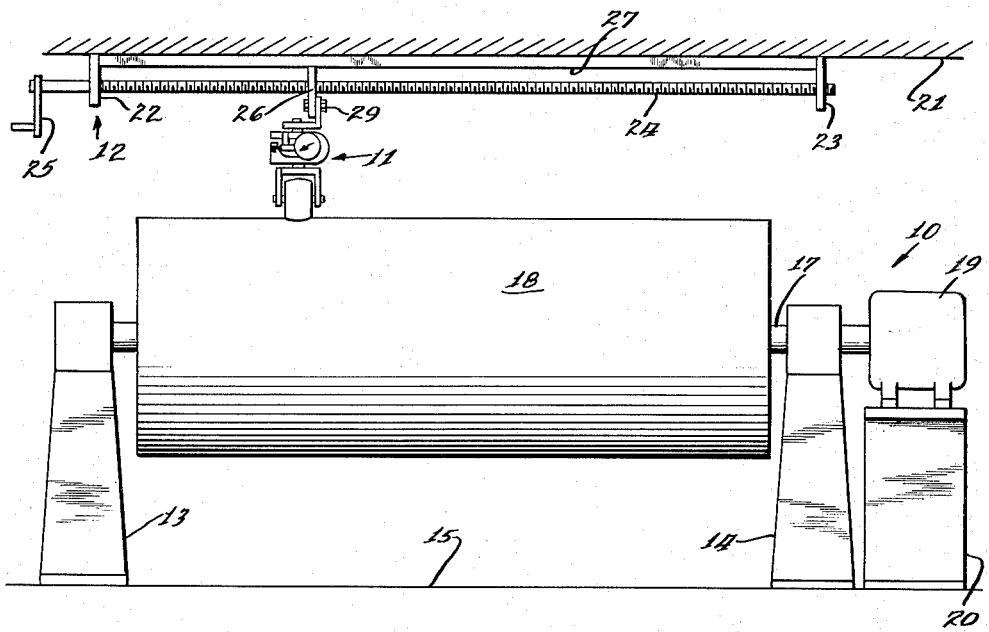
FIGURE 1 is a schematic illustration of an apparatus constructed in accordance with the invention for locating and measuring hardspots and gradual variations in the hardness of a relatively resilient material.

With specific reference to FIGURE 1, there is illustrated an apparatus that includes means 10 for supporting and rotating a roll to be tested, means 11 for indicating variations in the hardness of a resilient layer on the roll, and traversing means 12 for supporting the indicating means 11 and moving it along the length of the roll.

The support means 10 includes two vertical stands 13 and 14 that are mounted on a stationary platform or floor 15 and receive the shaft 17 of a roller 18 to be tested. A motor 19, which is mounted on a stand 20, is coupled to the roller shaft 17 and rotates the roller at a relatively low rate.

The indicating means 11 is further illustrated in FIGURES 2 and 3 and will be discussed in greater detail hereinafter.

The traversing means 12 is mounted adjacent the roll support means 10 on another stationary wall or barrier 21. It includes two end braces 22 and 23 which are fastened to the wall 21 and a power screw 24 which is mounted between the braces. The screw is fastened at one end to a hand crank 25 so that the screw 24 can be rotated about its axis relative to the indicating means 11 and the end braces 22 and 23.

A hole in a connecting link 26 is internally threaded to fit the power screw 24 and, as can be seen in FIGURE 1, is prevented from moving upwardly by a back stop 27 that bears against the upper end of the link 26. The adjacent surfaces of the link 26 and the back stop 27 are preferably broad flat faces so that the connecting link 26 is prevented from rotating about the axis of the power screw 24 when the screw is turned.

With reference to FIGURES 2 and 3, the indicating means 11 may be of the type described in the United States Patent No. 2,512,055 to R. R. Dillon, issued June 20, 1950 which includes a right angle iron 28 that is fastened to the connecting link 26 by a bolt 29, FIGURE 1, which extends through a slot 30 formed in the iron 28 and a similar slot formed in the connecting link 26.

The indicating means 11 further includes a substantially U-shaped frame 31 that has its upper leg 32 connected to the angle iron 28 by a bolt 33 that extends through the iron 28 and into this upper leg 32, and its lower leg 34 connected to a wheel support 35 by another bolt 36.

The wheel support 35 includes three members 37, 38 and 39 which are fastened together by a plurality of bolts 40, and a stationary axle 41 that extends through holes 42 formed in the members 37 and 39 and is held stationary by a set screw 43. Mounted on the axle 41 is a wheel 44 that normally contacts the roller 18 being tested. The friction between the axle 41 and the wheel 44 is reduced by a set of ball bearings 45 and 46 which have their outer rings 47 and 48 connected to the wheel 44 and their inner rings 49 and 50 connected to the axle 41.

As can be seen in FIGURE 2, the outer surface 51 of the wheel 44 in this embodiment of the invention is rounded to make the wheel barrel shaped and, if desired, this surface 51 may be knurled.

The U-shaped frame 31 supports a gauge 52 that includes a case 53, a calibrated dial 54, and an index hand 55. The gauge 52 is supported in approximately the center of the U-shaped frame 31 by a brace 56 that is connected at one end to the case 53 and at its other end to the upper leg 32 by a plurality of bolts 57.

The gauge 52 also includes a sensing finger 58 that is slidably mounted in the case 53 and a barrel 59. The end of the sensing finger 58 bears against an inclined surface 60 formed on a post 61 which is mounted on one end of the U-shaped frame 31.

It can be seen that when the two legs 32 and 34 of the frame 31 are forced inwardly toward each other, the gauge 52 will also move toward the leg 34 since it is mounted on the leg 32. As the gauge 52 moves, the sensing finger 58 also moves relative to the post 61 and the inclined surface 60 forces the sensing finger 58 into the barrel 59 and the case 53. The sensing finger 58 is coupled to the index hand 55 by conventional linkages inside of the case 53, and the dial 54 is calibrated to indicate the amount of this movement, which is a measure of the pressure being exerted to force the two legs 32 and 34 together.

In operation, the roller 18 to be tested is installed in the support means 10 and the indicating means 11 is lowered until the wheel 44 is pressed firmly into contact with the rubber layer covering the roll. When sufficient pressure is applied the bolt 29 is threaded into its nut until tight and the pressure reading on the dial 54 is noted. The motor 19 is then energized which causes the roller 18 to rotate relatively slowly. The wheel 44 of the force measuring means 11 also rotates with the roller 18 because it contacts the circumference of the roller 18. Of course, a sudden increase in the reading of the gauge 52 indicates the presence of a hard spot in the rubber layer adjacent the wheel 44, and a gradual variation in the gauge reading indicates a gradual non-uniformity in the hardness of the rubber layer. In a preferred method of operation, after each complete revolution of the roller 18 the hand crank 25 is turned which causes the indicating means 11 to move sequentially in a direction that is parallel to the axis of the roller 18. If the longitudinal movement of the means 11 after each complete revolution of the roll is approximately equal to the width of the contact area between the wheel and the roll, the entire surface area of the rubber covering on the roller 18 will be inspected.

Figure 4:
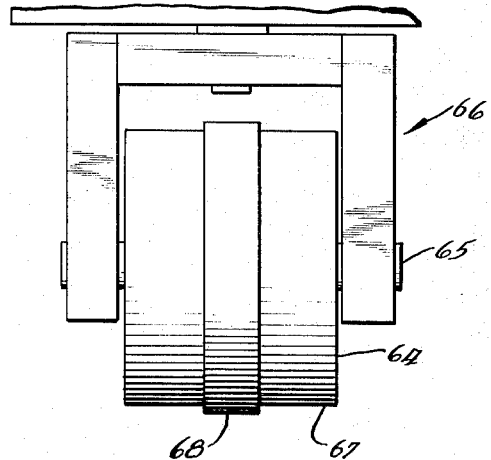
FIGURE 4 is an elevational view of another embodiment of the invention.

With specific reference to FIGURE 4, there is illustrated a preferred construction of the wheel for the indicating means 11 which is especially useful when a measurement of the degree of hardness of a defective portion of a roll is to be made. This embodiment of the invention includes a wheel 64 that is mounted on an axle 65 and a frame 66. The member 31 is fastened to the top of the frame 66 in the manner previously described with regard to the other embodiment of the invention. The outer surface of the wheel 64 includes a cylindrical portion 67 and a stop 68 that has an increased diameter. The step 68 is located at approximately the center of the wheel.

In operation, the step 68 is brought into firm contact with a roll to be inspected, and the relative degree of hardness is then determined by noting the reading on the force gauge. For example, if the gauge is calibrated to read force in pounds and the contact area between the wheel and roller is known in square inches, a value in lb./sq.in. can be obtained, which may be taken as a measure of the hardness of the material.

Since the step 68 is the only portion of the wheel 64 that contacts the roll to be inspected, a construction can be adopted wherein the cylindrical portion 67 on both sides of step 68 are eliminated. In this embodiment of the invention the wheel would have a width substantially equal to the width of the step 68 and the width of the frame 66 could be reduced correspondingly. If desired, the reduced width wheel could be supported by an axle and a single ball bearing and the frame 66.

In another method of inspecting a roller, the roll to be checked is placed in a lathe or grinder and the indicating means 11 is bolted to the compound of the lathe or the wheel cover of the grinder. The wheel of the indicating means is placed in contact with the rubber cover on the roller and a load is applied between the wheel and the cover. As the roller turns, any change in apparent hardness is indicated as a change in the load.

If desired, a level can be attached to the indicating means 11, preferably on the member 38 of the wheel support, so that the device can be adjusted until the axle 41 is parallel to the axis of the roller 18. To obtain accurate and consistent measurements, the indicating means 11 should extend outwardly along a radial line of the roller 18. As can be seen from the drawings, the bolts 33 and 36 that are coupled to the U-shaped frame 31 are in line with the center of the wheel 44 and a radial line of the roller 18.

It can be seen that a novel and useful measuring apparatus has been provided. It can pinpoint the location of hardspots in a resilient material and indicate gradual variations in the hardness. Also, a measurement of the degree of hardness can be obtained.

It will be apparent that modifications and variations may be affected without departing from the scope of the novel concepts of the present invention, and it will be understood that the application is to be limited only by the scope of the appended claims. For example, other means can be provided to support the roller and impart a rotating motion to it in place of the stands 13 and 14 and the motor 19. Further, the transversing means 12 and the indicating means 11 need not be positioned vertically above the roller 18 since accurate measurements can also be obtained if these elements are positioned at other angles relative to the roller 18.

We claim as our invention:

1. An apparatus for determining the existence and location of relatively hard spots in a resilient layer of material on a cylindrical roll having substantially the resiliency of rubber comprising,
   a pair of horizontally spaced end bearings positioned for rotatably supporting the roll for rotation about the roll axis,
   a rotatable testing wheel having a sufficiently small width to sink into said surface layer, with force applied thereto,
   a carriage supporting the wheel for rotation about an axis substantially parallel to said roll axis,
   a traversing guide extending accurately parallel to said roll axis for the length of the roll and supporting said carriage for movement along the roll at a uniform distance from the roll axis,
   a strong spring having a first portion mounted on the carriage biasing the wheel toward the roll,
      said spring having sufficient strength to force the wheel into said surface layer to deform the surface thereof,
      said spring having a second portion supporting said wheel,
   means adjustably mounting the first portion of the spring on the carriage so that the position of the first part can be adjusted and the biasing force changed for obtaining sufficient force on the wheel to depress said layer,
   and means for measuring the relative change in distance between said first and second spring portions to measure change in resiliency of the layer on the roll as a function of radial change in wheel position relative to the roll axis.

2. An apparatus for determining the existence and location of hard spots in a layer of resilient material in accordance with claim 1 wherein said spring is U-shaped and one of the legs of the U comprises said first portion and the other of the legs of the U comprises said second portion.

3. An apparatus for determining the existence and location of relatively hard spots in a roll having a surface of resilient material with substantially the resiliency of rubber comprising in combination,
- a pair of horizontally spaced end bearing supports for rotatably supporting the roll for rotation about the roll axis,
- a rotatable testing wheel having a sufficiently small width to sink into said surface of the roll,
- a carriage for supporting the wheel for rotation about an axis substantially parallel to said roll axis and supporting said carriage for movement along the roll at a uniform distance from the roll axis,
- a strong spring having a first portion secured to the carriage and a second portion secured to the wheel biasing the wheel toward the roll,
  - said spring having sufficient strength to force the wheel into said roll surface to deform the surface thereof,
- means adjustably mounting said spring so that the force of the spring urging the wheel against said surface can be changed to change the amount the roll surface is depressed, and means for measuring the relative radial change in position of the wheel relative to the carriage as the amount the surface is depressed changes with change in resiliency of said resilient surface so that the resiliency of the surface may be determined as a function of a wheel position change.

References Cited by the Examiner

UNITED STATES PATENTS

| | | | |
|---|---|---|---|
| 1,382,663 | 6/21 | Metzger. | |
| 1,446,300 | 2/23 | Lawrence et al. | 33—147 |
| 1,944,353 | 1/34 | Lindner | 73—78 X |
| 2,252,993 | 8/41 | Stewart | 73—78 |
| 2,441,283 | 5/48 | O'Hara | 73—78 |
| 2,661,542 | 12/53 | Bean | 33—179.52 |
| 2,695,520 | 11/54 | Karsai | 73—146 |
| 2,833,145 | 5/58 | McCullough | 73—144 |

FOREIGN PATENTS 1,038,970  9/58  Germany.

OTHER REFERENCES

W. C. Dillon & Co. Advertisement; Research/Development; November 1962, page 70.

RICHARD C. QUEISSER, *Primary Examiner*.

ROBERT L. EVANS, *Examiner*.